Dec. 3, 1935.   J. A. OLSON   2,023,206

SHAFT SEAL CONSTRUCTION

Filed May 20, 1933

Inventor
JOHN A. OLSON

By Richey & Watts
Attorneys

Patented Dec. 3, 1935

2,023,206

UNITED STATES PATENT OFFICE 2,023,206

SHAFT SEAL CONSTRUCTION

John A. Olson, Cleveland, Ohio, assignor to Ruth M. Olson, Cleveland, Ohio

Application May 20, 1933, Serial No. 672,012

3 Claims. (Cl. 286—7)

This invention relates to seals for rotary shafts of the type that operate for a portion of their length in fluid. The seal is intended to prevent the escape of fluid between the shaft and its bearings or the fixed part in which it rotates. The invention disclosed herein in some respects constitutes an improvement on the shaft seal disclosed in my application Serial No. 668,720, filed May 1, 1933.

An object of my invention is to provide a durable seal for rotary shafts which will require a minimum amount of service or attention. Another object of my invention is to provide a simple seal which can be economically manufactured and installed. A further object of my invention is to provide a seal which may be inserted and retained in an open ended casing. Another object is to provide a seal in which there will be little or no wear on the packing material employed, the seal being made between metallic surfaces. Another object is to provide a seal for rotary shafts which will remain leak proof regardless of limited vibratory or endwise movement of the shaft.

Figure 1:
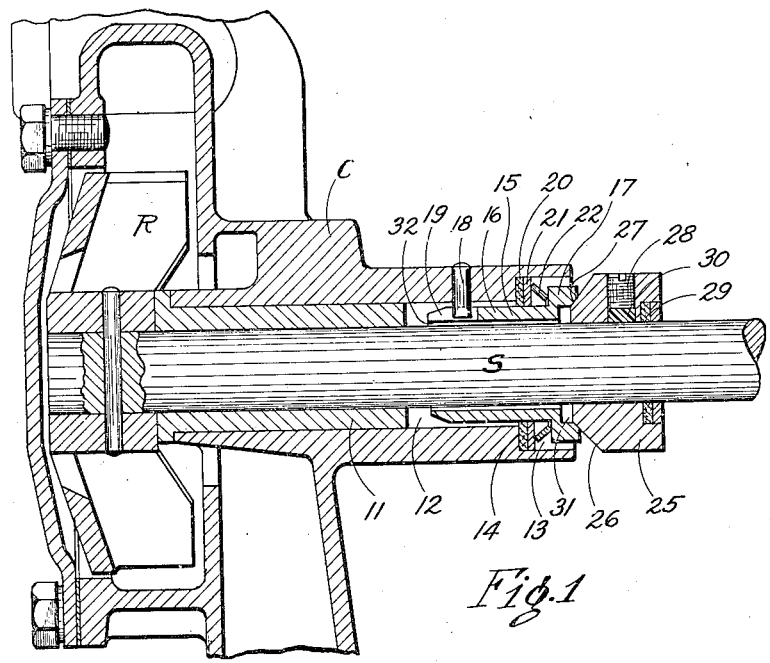
Figure 2:
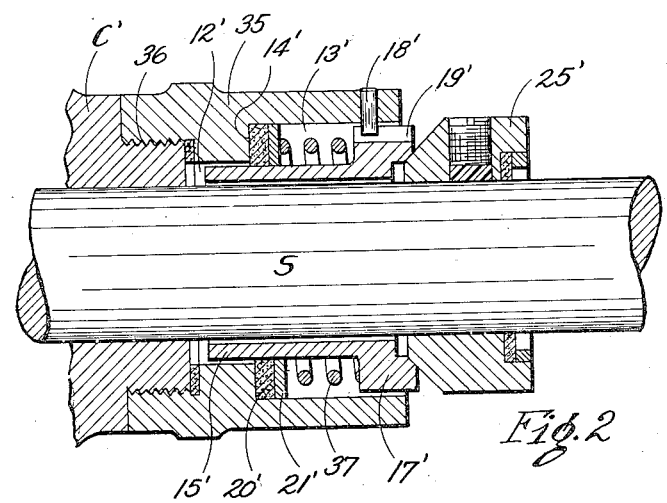

Further objects and advantages of my invention will become apparent from the following description of various forms thereof, reference being made to the accompanying drawing, wherein:

Figure 1 is a longitudinal section through a preferred form of my seal and illustrating the seal as used in conjunction with a pump; and Fig. 2 is a longitudinal section illustrating a modified form of my seal.

Referring to Fig. 1, I have illustrated my seal as adapted to prevent leakage between the pump casing C and the shaft S, which drives the pump rotor R. The shaft may be driven in any convenient manner and may be supported, for example, by a bushing 11 of an ordinary type mounted within the casing. It will be noted that the bushing terminates short of the end of the casing, thus leaving an annular chamber 12 surrounding the shaft. At the open end of the casing, the chamber is enlarged as at 13 thus providing a shoulder 14 between the two portions of the annular chamber.

My seal is arranged to be disposed partly within the annular chamber of the casing and is designed so that the seal may be held in place without the use of any caps or other retaining members, thus greatly simplifying the installation of the seal and the manufacturing operations necessary to produce the casing. To this end, I preferably provide a sealing bushing 15 which loosely surrounds the shaft and which has a sleeve portion 16 extending into the annular chamber 12, and a radial flange 17 which lies within the enlarged portion 13 of the chamber. The bushing may be prevented from rotation by a pin 18 which extends through the wall of the casing and engages the slot 19 in the sleeve of the bushing. The slot is arranged so that the bushing may have a limited amount of longitudinal movement although it is prevented from rotation, and as the pin engages the inner end of the bushing the outer end which carries the sealing surface can oscillate or swing to conform properly to the sealing ring.

To prevent leakage from taking place around the outside of the bushing, I provide a packing consisting of a packing washer 20 of asbestos or other suitable material, and a metallic washer 21, which make a sliding fit with the external diameter of the sleeve, and which are held in place against the shoulder 14 by means of a frustro-conical spring disc 22 which is compressed between the metallic washer and the flanged portion of the bushing 17.

To retain the bushing in place against the action of the spring and to prevent fluid from leaking from the inside of the bushing, I provide a sealing ring 25 having a beveled sealing surface 26 which cooperates with the sealing surface 27 of the bushing. The ring may be retained in place on the shaft by means of a set screw 28, and to prevent leakage between the ring and the shaft I may provide packing material 29 set into a recess in the ring. If desired, rubber packing 30 may be disposed beneath the set screw to prevent fluid from leaking around the threads and also to assist in holding the ring in place.

In order to allow for wear of the bushing, the flange 17 is cut away to produce a small annular chamber 31 between the sealing ring and the sleeve of the bushing. A sufficient amount of fluid will travel through the space 32 between the bushing and the shaft to lubricate properly the beveled sealing surfaces of the bushing and ring.

To install my sealing device in a pump casing it is only necessary to insert the packing washer 20, the metallic washer 21 and the spring disc 22 into the chamber 13, then to slide the sealing bushing into the chamber so that the pin 18 engages the slot 19, and thereafter to place the ring 25 on the shaft and push it into engagement with the sealing bushing so that the proper compression is produced in the spring. Then the set screw may be tightened and the installation is complete. The seal may be properly adjusted at any time by merely loosening the set screw and sliding the ring along the shaft.

It will be seen that the packing washer 20 will prevent any fluid from leaking around the bushing and finding the outside of the casing, while the cooperating sealing surfaces 26 and 27 and the packing material 29 and 30 will prevent leakage of any fluid which may find its way along the shaft within the bushing. The spring maintains the sealing surfaces in proper contact at all times, and the bushing is capable of a limited amount of longitudinal movement with respect to the casing, so that the seal will be maintained regardless of endwise movement or vibration of the shaft. Furthermore, it is to be noted that there is a small amount of clearance between the bushing and the shaft as at 32, so that the bushing can automatically align itself with the sealing ring. The wear is all taken between contacting metal surfaces which are properly lubricated by the fluid which travels along the shaft within the bushing.

In Fig. 2 of the drawing, I have illustrated a modified form of my invention which is adapted to be substituted for the ordinary packing nut. In this modification, I have provided a cylindrical casing 35 which is threaded as at 36 to engage corresponding threads on the pump casing C'. The cylindrical casing 35 is internally formed to provide chambers 12' and 13' with an intermediate shoulder 14'. The bushing 15' is constructed substantially the same as the bushing 15, except that the slot 19' which engages the pin 18' is disposed in the flange 17' of the bushing. Also in this modification, I employ a coil spring 37 in place of the spring disc of the previous modification, the coil spring being adapted to engage the shoulder of the bushing and to retain the packing washers 20' and 21' in engagement with the shoulder 14'. The construction of the sealing ring 25' is the same as that of the ring 25 and the operation of the seal is essentially the same as that described in connection with Fig. 1.

From the foregoing description of preferred and modified forms of my invention, it will be seen that I have provided a dependable fluid seal which can be easily manufactured and installed and which will maintain its leak proof properties for long periods of time. My seal requires a minimum amount of service or attention and will remain leak proof even under severe conditions in which endwise or vibratory movement of the parts takes place. My seal can be economically installed in existing machines in place of the ordinary packing nut, and in original installations my seal simplifies the construction of the casing in which the seal is to be disposed by reason of the fact that my sealing ring is disposed externally of the casing, thus making a closure for the casing entirely unnecessary.

In the present application, I have described preferred and modified forms of my invention. Changes and modifications therein will be apparent to those skilled in the art; for example, the type of spring illustrated in connection with Fig. 2 of the drawing may be employed in the seal illustrated in Fig. 1 of the drawing and vice versa. Accordingly, it is to be understood that my patent is not limited by the specific disclosures herein or in any manner other than by the scope of the appended claims when given the range of equivalents to which they may be entitled.

I claim:

1. A sealing device for preventing leakage of fluid between a rotatable shaft and a casing through which the shaft extends, said casing having an internal shoulder, said sealing device comprising a sealing bushing surrounding the shaft and disposed within the casing and spaced away from the inner surfaces thereof, means for holding said bushing against rotation with respect to the casing, packing means surrounding the bushing and engaging the internal shoulder of the casing for preventing leakage between the bushing and the casing, a sealing ring rigidly secured to the shaft and disposed externally of the casing, said ring and said bushing having cooperating sealing surfaces, and resilient means engaging said bushing and said packing means for retaining said packing means in engagement with the internal shoulder of said casing and urging said bushing into sealing engagement with said ring.

2. A sealing device for preventing leakage of fluid between a rotatable shaft and a casing through which the shaft extends, said casing having an internal shoulder, comprising a sealing bushing surrounding the shaft and held against rotation with respect to the casing, said bushing having a cylindrical portion, a shoulder, and a beveled sealing surface adjacent the shoulder, packing means surrounding said cylindrical portion and engaging the internal shoulder in said casing, a sealing ring adapted to rotate with the shaft and having a beveled sealing surface adapted to cooperate with the sealing surface of said bushing, and a spring surrounding the cylindrical portion of said bushing and adapted to engage said packing means and the shoulder on said bushing to retain the packing means in engagement with the internal shoulder in said casing and to urge said bushing into sealing engagement with said ring.

3. In a sealing device, the combination of two relatively movable members, means for creating a seal between said members including a part having a beveled sealing surface fixedly carried by one of said members, a sealing bushing carried by the other of said members, said bushing having a cylindrical portion, a shoulder, and a beveled portion adapted to cooperate with said beveled sealing surface, means for holding said sealing bushing against rotation with respect to said second member while allowing longitudinal movement with respect thereto, packing means for preventing leakage between said bushing and said second member, a spring surrounding the cylindrical part of the bushing and engaging said packing means and said shoulder and adapted to retain the packing means in position and to urge the beveled surface of the bushing into sealing relationship with the other beveled sealing surface.

JOHN A. OLSON.